(12) United States Patent
Takata et al.

(10) Patent No.: US 11,338,530 B2
(45) Date of Patent: May 24, 2022

(54) METHOD FOR PRODUCING OPTICAL COMPONENT, METHOD FOR PRODUCING PRODUCT INCLUDING TOUCH SENSOR, OPTICAL COMPONENT, AND TOUCH SENSOR DEVICE

(71) Applicant: JAPAN AVIATION ELECTRONICS INDUSTRY, LIMITED, Tokyo (JP)

(72) Inventors: Shingo Takata, Tokyo (JP); Yutaro Kogawa, Tokyo (JP); Emiko Ito, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 475 days.

(21) Appl. No.: 16/189,240

(22) Filed: Nov. 13, 2018

(65) Prior Publication Data

US 2019/0152176 A1 May 23, 2019

(30) Foreign Application Priority Data

Nov. 17, 2017 (JP) .............................. JP2017-221961

(51) Int. Cl.
*B29D 11/00* (2006.01)
*B32B 37/12* (2006.01)
*G06F 3/041* (2006.01)

(52) U.S. Cl.
CPC .... *B29D 11/0073* (2013.01); *B29D 11/00788* (2013.01); *B29D 11/00865* (2013.01);
(Continued)

(58) Field of Classification Search
CPC .......... B29D 11/0073; B29D 11/00788; B29D 11/00865; B32B 37/1286; G06F 3/041
See application file for complete search history.

(56) References Cited

U.S. PATENT DOCUMENTS

| 2011/0030881 A1* | 2/2011 | Sasaki .................. H01L 21/6836 156/153 |
| 2013/0057486 A1* | 3/2013 | Matsumoto ........... G06F 3/0445 345/173 |

(Continued)

FOREIGN PATENT DOCUMENTS

| CN | 104129129 A | 11/2014 |
| CN | 104854488 A | 8/2015 |

(Continued)

OTHER PUBLICATIONS

Office Action issued in KR App. No. 10-2018-0140641, dated Feb. 12, 2020 (w/ translation).

(Continued)

*Primary Examiner* — Mathieu D Vargot
(74) *Attorney, Agent, or Firm* — Greenblum & Bernstein, P.L.C.

(57) ABSTRACT

A method for producing an at least partially transparent optical component including a laminate including fabricating a precursor laminate by bonding a transparent substrate and a transparent film to each other with a transparent photocurable adhesive layer interposed therebetween; curing the transparent photocurable adhesive layer by applying light thereto to change the precursor laminate into the laminate thereby, such that a shear modulus G' of the transparent photocurable adhesive layer of the laminate measured under a condition of a temperature of 25° C. and a frequency of 1 Hz reaches a value within a range of $3\times10^5$ Pa$\leq$G'$\leq$$3\times10^7$ Pa; and forming a flush and surface of the laminate by cutting the laminate in a thickness direction, such that the flush end surface includes respective cut surfaces of the transparent film, the transparent photocurable adhesive layer, and the transparent substrate.

3 Claims, 4 Drawing Sheets

(52) U.S. Cl.
CPC .......... *G06F 3/041* (2013.01); *B32B 37/1284* (2013.01); *B32B 2457/20* (2013.01); *G06F 2203/04103* (2013.01)

(56) References Cited

U.S. PATENT DOCUMENTS

| | | | |
|---|---|---|---|
| 2014/0037952 A1* | 2/2014 | Shigetomi | C08F 20/68 428/355 AC |
| 2014/0184956 A1 | 7/2014 | Satou | |
| 2014/0320770 A1 | 10/2014 | Motohashi et al. | |
| 2015/0090574 A1 | 4/2015 | Lin et al. | |
| 2015/0346408 A1 | 12/2015 | Mizutani et al. | |
| 2017/0158922 A1 | 6/2017 | Tanikawa et al. | |
| 2018/0275317 A1* | 9/2018 | Shimode | B29D 11/0073 |

FOREIGN PATENT DOCUMENTS

| | | |
|---|---|---|
| JP | 2013-142132 A | 7/2013 |
| JP | 2013-176985 A | 9/2013 |
| JP | 2014-157238 A | 8/2014 |
| JP | 2014-160473 A | 9/2014 |
| KR | 10-2013-0044628 | 5/2013 |
| KR | 10-2014-0143740 | 12/2014 |
| KR | 10-2016-0042057 | 4/2016 |
| KR | 10-2017-0081131 | 7/2017 |

OTHER PUBLICATIONS

Office Action issued in Korean family member Patent Appl. No. 10-2018-0140641, dated Sep. 14, 2020 and English translation thereof.

Office Action issued in Japanese Counterpart Patent Appl. No. 2017-221961, dated Apr. 27, 2021, along with an English translation thereof.

Official Communication issued in Korean Patent Application No. 10-2018-0140641, dated Apr. 23, 2021, along with and English translation thereof.

Office Action issued in Chinese Counterpart Patent Appl. No. 201811340366.8, dated Feb. 1, 2021, along with an English translation thereof.

* cited by examiner

FIG. 4

TABLE

| G' (Pa) | $2 \times 10^5$ | $3 \times 10^5$ | $2 \times 10^6$ | $3 \times 10^7$ | $1 \times 10^8$ |
|---|---|---|---|---|---|
| STICKINESS AND FALLING | No | Yes | Yes | Yes | Yes |
| ADHESION | Yes | Yes | Yes | Yes | No |

METHOD FOR PRODUCING OPTICAL COMPONENT, METHOD FOR PRODUCING PRODUCT INCLUDING TOUCH SENSOR, OPTICAL COMPONENT, AND TOUCH SENSOR DEVICE

TECHNICAL FIELD

The present invention relates to an optical component used as a cover provided on, for example, a contact input surface of a touch sensor and a method for producing the optical component, and also relates to a touch sensor device and a method for producing a product including a touch sensor.

BACKGROUND ART

FIG. 1 shows a cross sectional structure of a portable electronic device described in Japanese Patent Application Laid Open No. 2014-160473 (published on Sep. 4, 2014, hereinafter referred to as Literature 1) as an example of a configuration including such the optical component. The portable electronic device includes a casing 11, an insert plate 12, a conductive cushion 13, a touch panel controller 14, a backlight 15, a liquid crystal display part 16, a touch panel part 17, a cover glass 18, an antiscattering film 19, an adhesive 20, a shield ground 21, and a battery 22.

In the configuration in FIG. 1, the cover glass 18 protects the touch panel part 17, and the antiscattering film 19 protects the cover glass 18 so as to prevent scattering of glass pieces when the cover glass 18 is broken. In this example, the cover glass 18 and the antiscattering film 19 are laminated on an upper surface (contact input surface) of the touch panel part 17.

The cover glass 18 and the antiscattering film 19 are fixed by the adhesive 20, and in this example, the cover glass 18 and the antiscattering film 19 have the same size.

SUMMARY OF THE INVENTION

As described above, in Literature 1, the optical component composed of a laminate including three layers: the cover glass 18, the adhesive 20, and the antiscattering film 19 is provided on the contact input surface of the touch panel part 17. The cover glass 18 and the antiscattering film 19 have the same size, and the laminate of the three-layer structure has flush end surfaces formed of end surfaces of the cover glass 18, the adhesive 20, and the antiscattering film 19 flush with each other.

However, in an optical component composed of a laminate formed by bonding a transparent substrate and a transparent film to each other with a layer of an adhesive interposed therebetween like the optical component composed of the laminate of the three-layer structure described in Literature 1, it is not easy but troublesome to accurately align and bond the three layers together so that the laminate has flush end surfaces, resulting in low production efficiency.

On the other hand, for example, if a film having a smaller size (area) than a substrate is used and three layers are bonded together without requiring end surfaces flush with each other, production efficiency improves. However, a peripheral edge of a substrate surface partially does not have the film, which impairs uniformity of the surface of an optical component and reduces visual quality of the optical component.

Then, to obtain flush end surfaces with high production efficiency in an optical component composed of a laminate of a three-layer structure, it can be considered that the laminate including three layers is cut in a thickness direction by one cutting step to form flush end surfaces.

However, in the optical component composed of the laminate fabricated in this manner, a cut surface of an adhesive layer is exposed on the end surface. Thus, in a step of assembling a touch sensor device or a product including a touch sensor by incorporating the optical component, an operator may touch the end surface of the optical component during handling, thereby causing a small piece of the layer of the adhesive to peel or fall off, or causing quality deterioration or a defect such as foreign matter adhering to the cut surface or further a film being peeled from an end. In addition, the layer of the adhesive is flexible and is hard to cut.

In view of these problems, the present invention has an object to provide a method for producing an optical component composed of a laminate having a flush end surface, without an exposed adhesive layer causing various defects in a subsequent assembling step of a product, and a method for producing a product including a touch sensor, and also provide an optical component and a touch sensor device.

According to the present invention, a method for producing an at least partially transparent optical component including a laminate comprises: a step of fabricating a precursor laminate by bonding a transparent substrate and a transparent film to each other with a transparent photocurable adhesive layer interposed therebetween; a step of curing the transparent photocurable adhesive layer by applying light thereto to change the precursor laminate into the laminate thereby, such that a shear modulus G' of the transparent photocurable adhesive layer of the laminate measured under a condition of a temperature of 25° C. and a frequency of 1 Hz reaches a value within a range of $3 \times 10^5$ Pa$\leq$G'$\leq 3 \times 10^7$ Pa; and a step of forming a flush and surface of the laminate by cutting the laminate in a thickness direction, such that the flush end surface includes respective cut surfaces of the transparent film, the transparent photocurable adhesive layer, and the transparent substrate.

A method for producing a product including a touch sensor according to the present invention comprises a step of bonding the optical component produced by the method for producing the optical component described above and the touch sensor or a device including the touch sensor to each other with another transparent adhesive layer therebetween.

According to a first aspect of the present invention, in an optical component comprising a laminate, the laminate including a transparent substrate, a transparent adhesive layer, and a transparent film stacked in this order, the transparent adhesive layer includes both a first type of crosslinking and a second type of crosslinking of (meta) acrylic polymer, the first type of crosslinking being formed of a first reaction site selected from a first group consisting of: a hydroxyl group, a carboxyl group, and an amino group, and a second reaction site selected from a second group consisting of: an isocyanate group, an epoxy group, and a metal atom, and the second type of crosslinking being formed by addition polymerization of unsaturated double bond, and an end surface of the laminate includes respective the cut surfaces of the transparent film, the transparent adhesive layer, and the transparent substrate flush with each other.

According to a second aspect of the present invention, in an optical component comprising a laminate, the laminate including a transparent substrate, a transparent adhesive layer, and a transparent film stacked in this order, the transparent adhesive layer contains (meta)acrylic polymer crosslinked with multifunctional (meta)acrylate, a shear modulus G' of the transparent adhesive layer measured under a condition of a temperature of 25° C. and a frequency of 1 Hz is within $3 \times 10^5$ Pa≤G'≤$3 \times 10^7$ Pa, and an end surface of the laminate includes respective the cut surfaces of the transparent film, the transparent adhesive layer, and the transparent substrate flush with each other.

A touch sensor device according to the present invention comprises a structure in which any of the optical components described above and a touch sensor or a device including a touch sensor are joined to each other with another transparent adhesive layer interposed therebetween.

According to the present invention, the optical component composed of the laminate including the film, the adhesive layer, and the substrate and having the flush end surface can be successfully produced. Although the end surface of the adhesive layer is exposed, an operator touching the end surface does not cause a small piece of the adhesive layer to peel or fall off, and does not cause a defect such as foreign matter adhering to the end surface or the film being peeled from an end.

This allows a touch sensor device or a product including a touch sensor to be subsequently successfully assembled.

BRIEF DESCRIPTION OF THE DRAWINGS

FIG. 4 is a table showing a relationship between a value of a shear modulus G' and a property of an adhesive layer;

DETAILED DESCRIPTION OF THE EMBODIMENTS

Embodiments of the present invention will now be described.

Figure 1:
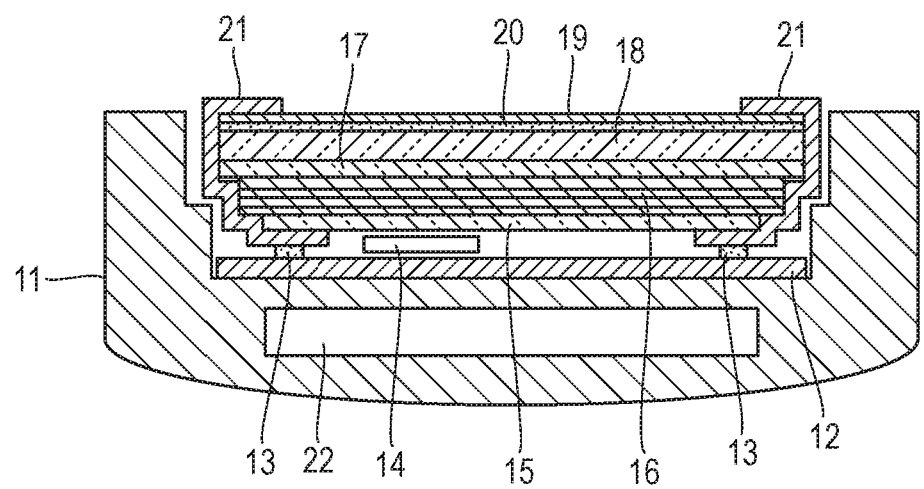
FIG. 1 illustrates an example of a conventional configuration of an optical component.
Figure 2:
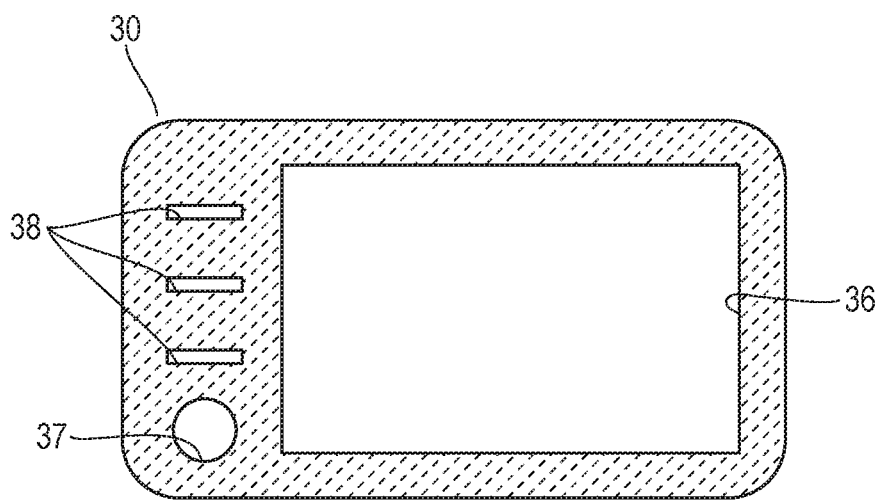
FIG. 2 is a plan view of an embodiment of an optical component according to the present invention.
Figure 3A:
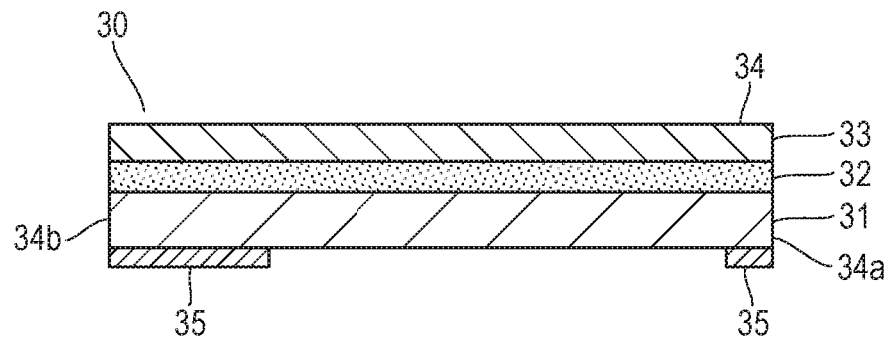
FIG. 3A illustrates a cross-sectional structure of the optical component in FIG. 2.

FIG. 2 shows a brief appearance of a cover provided on a contact input surface of a touch sensor as an embodiment of an optical component of the present invention. FIG. 3A shows a cross-sectional structure thereof. In FIG. 3A, thicknesses of components of the cover are exaggerated.

A cover 30 is composed of a laminate 34 including a transparent substrate 31, a transparent adhesive layer 32, and a transparent film 33 stacked in this order, and further includes a light blocking design part 35 in this example. In this example, the design part 35 is formed on a peripheral edge of a surface of the substrate 31 opposite to a surface facing the film 33. In FIG. 2, a portion with the design part 35 is hatched, and the contact input surface of the touch sensor is positioned in a transparent region 36 within the frame-like design part 35. In FIG. 2, reference numerals 37, 38 denote holes extending through the cover 30 and in which push buttons or the like are disposed.

In the cover 30 having the configuration as described above, the substrate 31 basically serves to protect the touch sensor, and the film 33 basically serves as an antiscattering film that prevents scattering of broken pieces when the substrate 31 is broken.

The substrate 31 is made of glass or resin, and the film 33 is made of polyethylene terephthalate (PET), triacetylcellulose (TAC), cycloolefin polymer (COP), or the like. A glass film may be used as the film 33. The adhesive layer 32 is a photocurable adhesive layer containing (meta)acrylic polymer.

The present invention has a feature in that the photocurable adhesive layer containing (meta)acrylic polymer is moderately cured, and a shear modulus (storage modulus) G' is used as an index of a curing state.

Experimental results will be described here on changes of properties of the photocurable adhesive layer such as stickiness of the photocurable adhesive layer, peeling and falling caused by an operator touching the photocurable adhesive layer and further adhesion to an object to be adhered to as a function of the value of the shear modulus G'. Measurement conditions (dynamic viscoelasticity measurement conditions) of the shear modulus G' are as described below:

Measurement temperature range: −40 to +140° C.
Temperature increasing speed: +3° C./min
Measurement temperature: 25° C.
Strain: 1%
Frequency: 1 Hz
Jig: parallel plate φ25 mm
Sample thickness: 400 to 600 μm Specifically, the value of the shear modulus G' is a measurement value at the measurement temperature (25° C.) in a process of measurement while changing the measurement temperature range (−40 to +140° C.) at the temperature increasing speed (+3° C./min).

A table in FIG. 4 shows a relationship between the value of the shear modulus G' and the properties. In the column of stickiness and falling, a case without stickiness and peeling or falling off is shown by Yes, and a case with stickiness and peeling or falling off is shown by No. In the column of adhesion, a case without any problem in adhesion to an object to be adhered to is shown by Yes, and a case with poor adhesion causing peeling is shown by No. The value of the shear modulus G' may be changed, for example, by changing the length of an alkyl group in an ester bond portion of acrylic.

The experimental results in the table show that with the value of the shear modulus G' of the photocurable adhesive layer being within $3 \times 10^5$ Pa≤G'≤$3 \times 10^7$ Pa, stickiness and peeling or falling off can be eliminated, and also an adhesive layer having hardness with no problem in adhesion can be obtained.

Now, based on the experimental results, a method for producing the cover 30 in FIGS. 2 and 3A will be described in detail according to the order of steps.

(1) The design part is partially printed on the substrate.

(2) The substrate and the film are bonded to each other with the photocurable adhesive layer interposed therebetween to fabricate a precursor laminate. The photocurable adhesive layer includes, specifically, thermal crosslinking of (meta)acrylic polymer formed of a first reaction site selected from a first group consisting of a hydroxyl group, a carboxyl group, and an amino group, and a second reaction site selected from a second group consisting of an isocyanate group, an epoxy group, and a metal atom. The photocurable adhesive layer is an adhesive sheet, and the adhesion thereof bonds the substrate and the film together.

(3) Light is applied to the photocurable adhesive layer to change the precursor laminate into the laminate thereby. The light is applied to the photocurable adhesive layer through the film on which no design part is formed. Such a photocurable adhesive layer is generally of an ultraviolet curable type, and for example, ultraviolet light having a wavelength λ of 365 nm is applied. The ultraviolet light is applied to cure the photocurable adhesive layer such that the shear modulus G' of the photocurable adhesive layer measured under the measurement condition of the temperature of 25° C. and the frequency of 1 Hz reaches a value within a range of $3\times10^5$ Pa≤G'≤$3\times10^7$ Pa.

(4) The laminate fabricated by curing the photocurable adhesive layer as described above is cut in a thickness direction. By this cutting step, the laminate is formed into the laminate 34 in FIG. 3A. Specifically, end surfaces of the laminate 34 are flush end surfaces including respective cut surfaces of the film 33, the adhesive layer 32, and the substrate 31 as end surfaces 34*a*, 34*b* in FIG. 3A. The shaped flush end surfaces also include a cut surface of the design part 35. If the thickness of the adhesive layer 32 exceeds 30 µm, stickiness and peeling or falling starts to occur, and thus the thickness is set to 30 µm or less. On the other hand, if the thickness is less than 10 µm, poor adhesion starts to occur, and thus the thickness is set to 10 µm or more. Therefore, the thickness is preferably set to 10 to 30 µm.

The cover 30 is completed by the above steps.

The light can be applied to the photocurable adhesive layer to cure the photocurable adhesive layer, and the value of the shear modulus G' can be within $3\times10^5$ Pa≤G'≤$3\times10^7$ Pa as described above by (meta)acrylic polymer being crosslinked with multifunctional (meta)acrylate, in other words, by the fact that (meta)acrylic polymer includes thermal crosslinking (a first type of crosslinking) and also a second type of crosslinking (crosslinking including photocrosslinking) formed by addition polymerization of unsaturated double bond, and that the two types of crosslinking are combined to form an interpenetrating polymer network.

From this point, as a condition definition of the adhesive layer 32 (cured adhesive layer) of the laminate 34, instead of the definition that the adhesive layer 32 contains (meta)acrylic polymer crosslinked with multifunctional (meta)acrylate, and the shear modulus G' measured under the conditions of the temperature of 25° C. and the frequency of 1 Hz is within $3\times10^5$ Pa≤G'≤$3\times10^7$ Pa, it may be defined that the adhesive layer 32 includes both the first type of crosslinking (thermal crosslinking) formed of the first reaction site and the second reaction site of (meta)acrylic polymer, and the second type of crosslinking (crosslinking including photocrosslinking) formed by addition polymerization of unsaturated double bond of (meta) acrylic polymer.

In the example described above, the light blocking design part 35 is partially formed by printing on a surface of the substrate 31 opposite to a surface facing the film 33 (a surface opposite to a surface to be bonded to the film 33). However, the design part 35 may be partially formed on a surface of the film 33 facing the substrate 31 (a surface to be bonded to the substrate 31). The design part 35 is provided on either the surface of the film 33 facing the substrate 31 or the surface of the substrate 31 opposite to the surface facing the film 33.

Figure 3B:
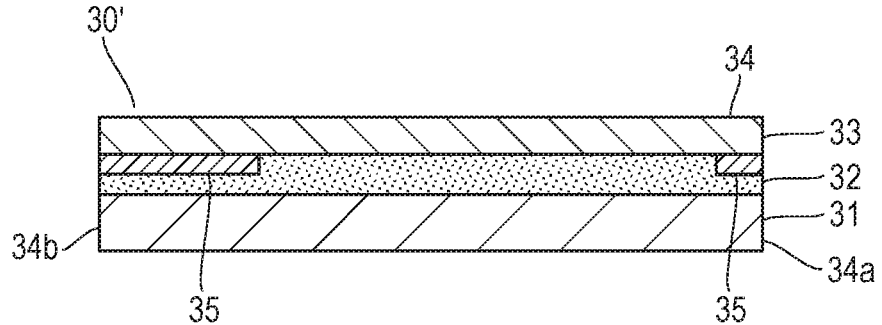
FIG. 3B illustrates another cross-sectional structure of the optical component.

FIG. 3B shows a cover 30' in which the design part 35 is formed on the surface of the film 33 facing the substrate 31. Components corresponding to those in FIG. 3A are denoted by the same reference numerals. As in FIG. 3A, thicknesses of components are exaggerated.

In the configuration in FIG. 3B, light (ultraviolet light) is applied to the photocurable adhesive layer through the substrate on which no design part is formed to cure the photocurable adhesive layer. For such a configuration without a design part, a direction of applying the light to the photocurable adhesive layer is not particularly limited.

The optical component and the method for producing the optical component according to the present invention have been described taking the cover provided on the contact input surface of the touch sensor as an example. The adhesive layer bonds the film and the substrate together and is then moderately cured by application of the light. Thus, the adhesive layer can be more easily cut than a layer of an uncured adhesive, thereby allowing the cover including the end surfaces of the film, the adhesive layer, and the substrate flush with each other to be successfully produced.

Also, in a subsequent assembling step of a touch sensor device or a product including a touch sensor, even if the operator touches the end surface of the cover, a small piece of the adhesive layer does not peel or fall off from the cut surface of the adhesive layer, or a defect does not occur such as foreign matter adhering to the cut surface or the film being peeled from an end. This allows the touch sensor device or the product including the touch sensor to be subsequently successfully assembled.

Figure 5:
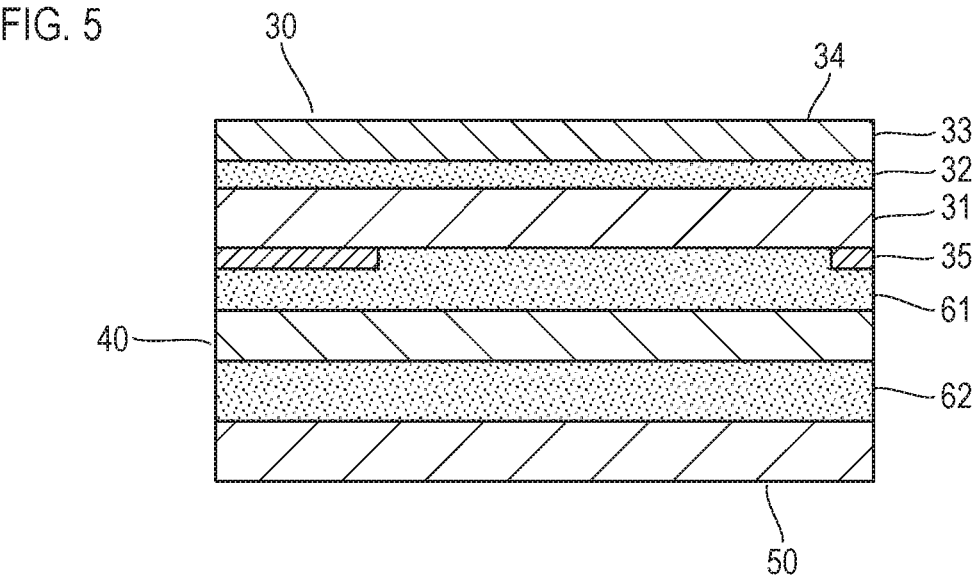
FIG. 5 is a cross-sectional view of an embodiment of a touch sensor device according to the present invention.
Figure 6:
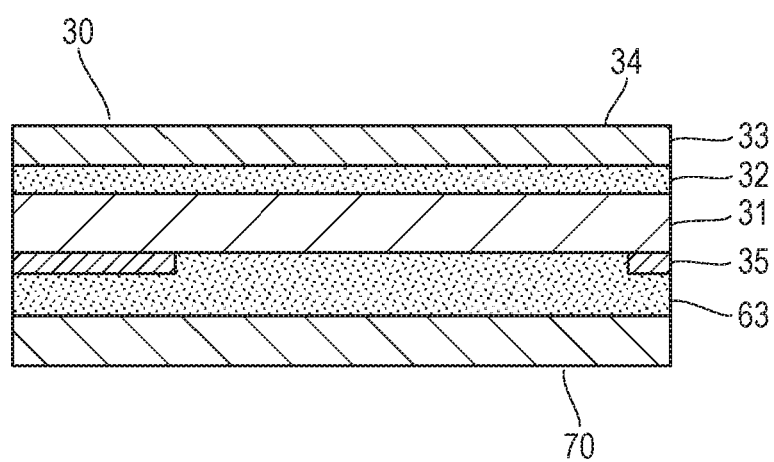
FIG. 6 is a cross-sectional view of another embodiment of a touch sensor device according to the present invention.

FIGS. 5 and 6 schematically show cross-sectional structures of the touch sensor device including the cover 30 in FIGS. 2 and 3A. In FIG. 5, reference numeral 40 denotes the touch sensor, and reference numeral 50 denotes a screen display device. In FIG. 6, reference numeral 70 denotes a screen display device including a touch sensor.

In FIG. 5, the cover 30 is joined to the touch sensor 40 with a transparent adhesive layer 61 therebetween, and the touch sensor 40 is joined to the screen display device 50 with a transparent adhesive layer 62 therebetween. In FIG. 6, the cover 30 is joined to the screen display device 70 including a touch sensor with a transparent adhesive layer 63 therebetween.

Such a cover provided on the contact input surface of the touch sensor often requires an ultraviolet absorbing function to prevent components in the touch sensor device from being exposed to ultraviolet light and deteriorated with time, and further to protect the film 33 and the substrate 31 themselves that constitute the laminate 34 from being deteriorated by ultraviolet light.

The film 33 is often a functional film having an antiscattering function and also an antireflection performance. Also in that case, the film often has high transmittance for a visible light range and low transmittance of ultraviolet light.

In those cases, if the photocurable adhesive layer is a general ultraviolet curable adhesive layer as described above, curing by application of light cannot be successfully performed. In the present invention, the photocurable adhesive layer can be successfully cured in those cases.

At least one of the substrate 31 and the film 33 contains an ultraviolet absorbing agent, or at least one of the substrate 31 and the film 33 has light transmittance of less than 50% for a light wavelength range of 350 to 390 nm and 50% or more for a light wavelength range of 390 to 750 nm. Specifically, at least one of the substrate 31 and the film 33 has an ultraviolet screening effect. In this case, the ultraviolet curable adhesive layer cannot be successfully cured a) if the design part 35 is formed on the substrate 31 and at least the film 33 has the ultraviolet screening effect, b) if the design part 35 is formed on the film 33 and at least the substrate 31 has the ultraviolet screening effect, and c) if the design part 35 is not formed but both the film 33 and the substrate 31 have the ultraviolet screening effect. Thus, for these three cases, the photocurable adhesive layer contains a light radical generator that reacts with certain wavelength component light within a light wavelength range of 390 to 450 nm and (meta)acrylic polymer, and the light applied to the photocurable adhesive layer in a step of curing the photocurable adhesive layer includes the wavelength component light.

Such a photocurable adhesive layer can be used to successfully cure the adhesive layer even if the substrate 31 and/or the film 33 has the ultraviolet screening effect. As the light radical generator that reacts with the certain wavelength component light within the light wavelength range of 390 to 450 nm as described above, for example, an acylphosphine oxide light radical generator may be used. Also, a metal halide lamp or the like may be used as a light source for applying the light within the light wavelength range to the adhesive layer.

The present invention has been described above taking the cover disposed in the contact input surface of the touch sensor as an example. However, the optical component according to the present invention is not limited to the exemplified cover, but may be applied to an object composed of a laminate including a transparent substrate, a transparent adhesive layer, and a transparent film stacked in this order.

What is claimed is:

1. A method for producing an at least partially transparent optical component including a flush-ended laminate, comprising:

partially printing a light blocking design part on one of a surface of a transparent film to be bonded to a transparent substrate and a surface of the transparent substrate opposite to a surface to be bonded to the transparent film;

bonding the transparent substrate and the transparent film to each other with a transparent photocurable adhesive layer interposed therebetween to fabricate a first precursor laminate, the first precursor laminate comprising the transparent film, the transparent photocurable adhesive layer that is uncured, and the transparent substrate;

curing the transparent photocurable adhesive layer by applying light thereto to change the transparent photocurable adhesive layer into a cured transparent adhesive layer and to change the first precursor laminate into a second precursor laminate thereby, the second precursor laminate comprising the transparent film, the cured transparent adhesive layer, and the transparent substrate, wherein a shear modulus G' of the cured transparent adhesive layer measured under a condition of a temperature of 25° C. and a frequency of 1 Hz reaches a value within a range of $3\times10^5$ Pa≤G'≤$3\times10^7$ Pa as a result of the curing; and cutting the second precursor laminate in a thickness direction thereof to change the second precursor laminate into the flush-ended laminate having a flush end surface formed by the cutting, wherein the flush end surface includes respective cut surfaces of the transparent film, the cured transparent adhesive layer, and the transparent substrate; wherein in the curing of the transparent photocurable adhesive layer, the light is applied to the transparent photocurable adhesive layer through one of the transparent film and the transparent substrate on which the light blocking design part is not printed; and the flush end surface formed in the cutting of the second precursor laminate further includes a cut surface of the light blocking design part.

2. The method for producing the optical component according to claim 1, wherein the one of the transparent film and the transparent substrate on which the light blocking design part is not printed contains an ultraviolet absorbing agent;

the transparent photocurable adhesive layer contains a light radical generator that reacts with a certain wavelength component light within a light wavelength range of 390 to 450 nm and (meta)acrylic polymer; and the light applied to the transparent photocurable adhesive layer in the curing of the transparent photocurable adhesive layer includes the certain wavelength component light.

3. A method for producing a product including a touch sensor, comprising bonding the optical component produced by the method for producing the optical component according to claim 1 and the touch sensor or a device including the touch sensor to each other with another transparent adhesive layer interposed therebetween.

\* \* \* \* \*